Figure 1:
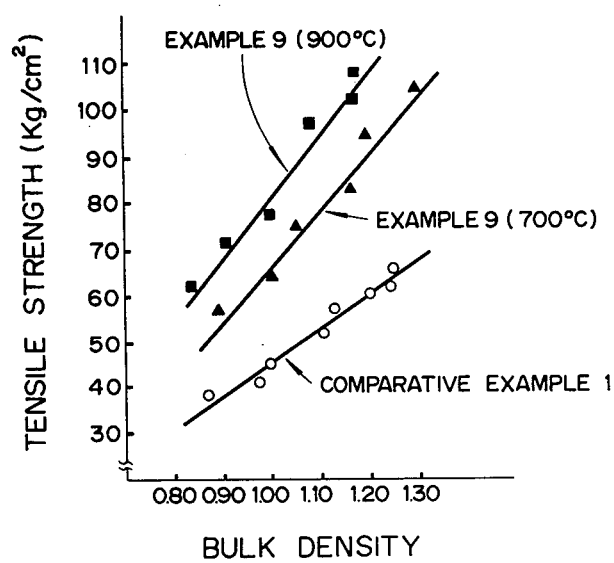

United States Patent [19]

Ishikawa et al.

[11] 4,226,821
[45] Oct. 7, 1980

[54] PROCESS FOR PRODUCING FLEXIBLE GRAPHITE

[75] Inventors: Toshikatsu Ishikawa, Tokyo; Kazuhisa Kawazumi, Yokohama; Hiroshi Yamazoe, Yokohama; Isao Sugiura, Yokohama, all of Japan

[73] Assignee: Nippon Carbon Co., Ltd., Tokyo, Japan

[21] Appl. No.: 967,804

[22] Filed: Dec. 8, 1978

[30] Foreign Application Priority Data

Dec. 28, 1977 [JP] Japan .................... 52/160547

[51] Int. Cl.³ .................... B32B 3/26; C04B 41/28
[52] U.S. Cl. .................... 264/134; 264/29.5; 264/29.6; 264/126
[58] Field of Search ............ 264/59, 60, 29.1, 29.5, 264/29.7, 134, 125, 126, 29.6

[56] References Cited

U.S. PATENT DOCUMENTS

| 3,567,807 | 3/1971 | Shannon | 264/29.1 |
| 3,573,122 | 3/1971 | Olstowski | 264/29.1 |
| 3,708,451 | 1/1973 | McWhorter et al. | 264/29.1 |
| 3,736,159 | 5/1973 | Gibson et al. | 264/29.1 |
| 3,969,124 | 7/1976 | Stewart | 264/29.1 |

Primary Examiner—Donald J. Arnold
Attorney, Agent, or Firm—Jordan and Hamburg

[57] ABSTRACT

A process for the production of flexible graphite comprising incorporating particulate expanded graphite having a c direction expansion at least 10 times as great as that of the original c direction dimension with an organo-silicon high molecular weight compound having carbon and silicon as the skeletal components, such as polysilmethylenesiloxane, or with a colloidal silica, drying the resulting mixture, pressure molding the dried mixture and heat treating the molded mixture at 500°–2000° C. thereby to produce the flexible graphite. In one embodiment, this invention relates to flexible graphite obtained by the process.

10 Claims, 2 Drawing Figures

PROCESS FOR PRODUCING FLEXIBLE GRAPHITE

This invention relates to a process for producing flexible graphite having excellent oxidation resistance and it also relates to flexible graphite obtained by the process.

Flexible graphite which has heretofore been used is that obtained by compression molding expanded graphite in particulate form in the presence or absence of a binder such as a phenolic resin and, if necessary, subjecting the thus molded expanded graphite to heat treatment and the like. The particulate expanded graphite may be obtained by treating natural graphite, Kish graphite or the like having a laminar crystal structure with sulphuric acid, nitric acid, bromine or the like to form interlayer compounds in the starting graphite and then heating the thus treated graphite at a high temperature of 100° C. or higher thereby obtaining so-called particulate expanded graphite wherein the interlayer gap or distance in the direction perpendicular to the carbon layers is expanded to have a distance at least 10 times as great as that of the original laminar graphite (the direction perpendicular to the carbon layers being hereinafter referred to as "c direction" and such expansion being hereinafter referred to as a "c direction expansion").

Flexible graphite prepared by compression molding such particulate expanded graphite, has flexibility, gas-tightness and elasticity as its features and retains heat and electrical conduction, chemical resistance, heat stability, self-lubrication and radiation resistance as the inherent properties of the starting graphite and, therefore, it has found its wide use particularly as material for packing and gaskets. This conventional graphite material is still serviceable as packing or gaskets even at an extremely low temperature (in the case of using as packing for LNG containers) or even in a high-temperature atmosphere at 200° C. or higher, however, it will vanish or consume in an oxidizing atmosphere due to its consumption by oxidation. Because of this, the highest temperature at which it may reliably be used is about 450° C. when exposed to air and about 600° C. when sealed in flanges and valve boxes.

A primary object of this invention is to provide flexible graphite which may be used without losing the features of conventional flexible graphite even in an oxidizing atmosphere at 500° C. or higher and is excellent in strength and wear resistance and very suitable in its sheet, laminate or block form for use as material particularly for packing and gaskets; these properties are obtained by heat treating a mixture of conventional flexible graphite with a colloidal silica such as ethyl silicate or with an organo-silicon high molecular weight compound such as polysilmethylene composed of carbon and silicon as the main skeletal components, thereby to form in the silicon compound $SiO_2$ or $SiC$ which has strengthening effects on a bond between the graphite and the silicon compound.

The primary object of this invention may be achieved either by mixing a particulate expanded graphite with a solution or emulsion of an organo-silicon high molecular weight compound composed of carbon and silicon as the main skeletal components, preliminarily pressure molding the resulting mixture if desired, drying the molding so obtained, pressure molding the dried molding to an extent that a predetermined density is obtained thereon and then heating the thus densified molding to 500°–2000° C., or by molding a particulate expanded graphite to obtain an expanded graphite molding, impregnating the thus-obtained expanded graphite molding with a solution or emulsion of such an organo-silicon high molecular weight compound, drying the impregnated molding, pressure the dried molding if desired, and then heating the dried molding to 500°–2000° C. to obtain a desired flexible graphite. Said primary object may alternatively be achieved by following the aforesaid procedure except that a colloidal silica is substituted for the organo-silicon high molecular weight compound.

The particulate expanded graphite used in this invention is one having a c direction expansion at least 10 times that of the original c direction dimension, and it is obtained by subjecting natural graphite, synthetic graphite such as pyrolysis graphite, Kish graphite or other graphite having laminar crystal structure to, for example, immersion in an oxidizer such as sulphuric acid, nitric acid, phosphoric acid, hydrogen chlorate, chromic acid or bromine to form interlayer compounds in the graphite, washing the thus-immersed graphite with water as required and then heat treating the washed graphite at at least 100° C. (particularly preferably, at least 1000° C.) in a non-oxidizing atmosphere. The degree of c direction expansions may be controlled by selecting conditions of reaction with the oxidizer, conditions of heat treatment, and the like. The use of expanded graphite having a c direction expansion less than 10 times that of the original c direction dimension will make it difficult to obtain graphite still have flexibility even after it has been molded.

The particulate expanded graphite or the molding thereof is mixed or impregnated with a silicon compound selected from the group consisting of colloidal silicas and organo-silicon high molecular weight compounds in solution or emulsion containing carbon and silicon as the skeletal components.

The organo-silicon compounds used herein are as follows:

(1) Compounds having the following structural or skeletal components

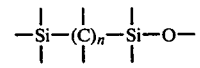

wherein n is an integer of from 1 to 6,

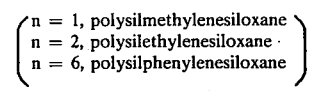

(2) Compounds having the following skeletal components

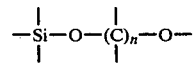

wherein n is as defined above,

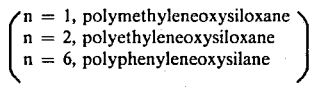
(n = 1, polymethyleneoxysiloxane
 n = 2, polyethyleneoxysiloxane
 n = 6, polyphenyleneoxysilane)

(3) Compounds having the following skeletal components

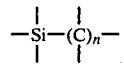
$$-\underset{|}{\overset{|}{Si}}-(\underset{|}{\overset{|}{C}})_n-$$

wherein n is as defined above,

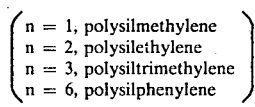
(n = 1, polysilmethylene
 n = 2, polysilethylene
 n = 3, polysiltrimethylene
 n = 6, polysilphenylene)

(4) Compounds having at least one of the skeletal components (1) to (3) as a part of their cyclic or three dimensional molecular structure, and (5) Mixtures of at least two of the compounds (1) to (3).

In a case where the organo-silicon high molecular weight compounds are to be used in solution form in mixing with the particulate expanded graphite, they may be used as they are if they are originally liquid or they may be used in solution in a solvent irrespective of the fact that they are originally liquid or powdery. The solvents used herein include benzene, toluene, xylene, hexane, ether, tetrahydrofuran, dioxane, chloroform, methylene chloride, petroleum ether, petroleum benzin, ligroin, DMSO, DMF and DVB. The organo-silicon high molecular weight compounds may, if desired, be dissolved in these solvents thereby to form a viscous liquid for mixing with the particulate expanded graphite. The suitable mixing ratio between the organo-silicon high molecular weight compound and the particulate expanded graphite may vary depending on the ratio of Si/C and the average molecular weight of said high molecular weight compound; the organo-silicon compound may be used in an amount of 1–50%, preferably 5–40%, by weight of the expanded graphite. The organo-silicon high molecular weight compounds having an average molecular weight of 800–5000 and composed substantially of polysilmethylene, polycarbosilane or polyphenylpolysiloxane, may be used in an amount of 5–40% by weight of the expanded graphite. The colloidal silica used herein may contain SiO$_2$ in a concentration of preferably 10–30% by weight and it may be incorporated in an amount of 5–40% by weight (based on graphite) in the particulate expanded graphite for mixing together and molding. It is not necessary to mix the particulate expanded graphite with the organo-silicon compound or colloidal silica at any elevated temperatures. These materials may be mixed together at ambient temperature. Particularly, the use of elevated temperatures is not desirable since the colloidal silica will precipitate SiO$_2$ during the mixing at the elevated temperatures. Molding of the mixture is effected by compression molding in a mold, compression molding with rolls, or the like to an extent that a product having a bulk density of about 0.3–2.0 is obtained.

It is also possible to obtain flexible graphite material having higher strength, corrosion resistance and heat resistance by molding said mixture incorporated with at least one of inorganic binders such as oxidized graphite (in an amount 3–50% by weight), boric acid (in an amount of 3–15% by weight) and aluminum phosphate (in an amount of 0.1–30% by weight) as well as with up to 30% by weight of at least one of inorganic fillers such as carbon, particulate graphite, powdered refractory material, asbestos and carbon fibers. The aforesaid percentages are based on the weight of the expanded graphite used.

A molding made from the expanded graphite and organo-silicon high molecular weight compound together with or without such a binder and/or filler is then heat treated at 500°–2000° C. in a non-oxidizing atmosphere whereby the organo-silicon compound is partly pyrolyzed at 500° to 800° C. to release as volatile material the pyrolyzed organic material containing carbon, hydrogen and silicon while the remaining carbon and silicon are reacted together at higher than about 800° C. to gradually form SiC which is effective in strengthening a bond between the graphite and the organo-silicon compound, thus producing flexible graphite having excellent oxidation resistance. In cases where said starting molding is heat treated at a temperature of at least 1250° C., the organo-silicon compound is approximately perfectly converted to SiC thereby to obtain flexible graphite (in which the graphite and silicon are securely bonded together) having further remarkably improved oxidation resistance. On the other hand, in cases where such a molding composed of the expanded graphite and the silicate sol is heat treated, the use of a heat treating temperature of about 500° C. will yield flexible graphite having excellent oxidation resistance and the use of a treating temperature above 1550° C. will produce some amount of SiC thereby to yield flexible graphite having further improved oxidation resistance.

Alternatively, a molding obtained by compression molding the particulate expanded graphite together with or without at least one of said binders in said amount and/or at least one of said filters in sand amount to an extent that a bulk density of about 0.3–2.0 is reached, is impregnated with a solution of a silicon compound selected from the group consisting of the organo-silicon high molecular weight compounds and the colloidal silicas and then heat treated at 500°–2000° C. thereby to obtain a desired flexible graphite.

In order to effect suitable impregnation with a solution or emulsion of the silicon compound, it is necessary to adjust the concentration of the solution or emulsion with the use of a solvent or diluent. To this end, it is preferable to use an organo-silicon compound having an average molecular weight of 800–5000 and composed mainly of polysilmethylene, polycarbosilane or polyphenylpolosiloxane, in the form of a 40–60 wt.% solution if DVB (divinylbenzene) is used as the diluent. In order to obtain a product having satisfactory mechanical properties without losing flexibility, the amount of the impregnated silicon compound remaining in the expanded graphite after the heat treatment should be at least 3%, preferably 3–10%, by weight of the expanded graphite. In the impregnation, it is particularly preferable to use an organo-silicon high molecular weight compound having an average molecular weight of 800–3000 since in this case suitable impregnation may be effected with the use of a solvent in a less amount. Further, in the impregnation, it is preferable to use a colloidal silica containing SiO$_2$ in a concentration of about 12–20%. An expanded graphite molding is degassed under a reduced pressure of 1–5 Torr in an autoclave and then immersed in the colloidal silica under a gas pressure of 4–6 Kg/cm$^2$G for 5–20 minutes. A molding of the particulate expanded graphite impregnated with a solution of the organo-silicon compound in a solvent is heated to a temperature several degrees centigrade higher than the boiling point of the solvent to evaporate the solvent from the organo-silicon compound solution impregnated in the molding; however, if in such a case a curable diluent such as DVB is used in substitution for the solvent, then the diluent is thermally cured. Thereafter, the thus-heated molding is further heat treated at 500°–2000° C. in a non-oxidizing atmosphere to produce thereon the same bonding effects as in the previously mentioned process wherein the particulate expanded graphite and organo-silicon compound are molded together without the use of any solvents, thereby obtaining a desired flexible graphite.

The mixing or impregnation of the particulate expanded graphite with an emulsion of the organo-silicon high molecular weight compound or the impregnation of the expanded graphite molding with the emulsion eliminates the difficulties raised in the mixing of the particulate expanded graphite with the organo-silicon high molecular weight compound without emulsifying this compound and the impregnation of the expanded graphite molding with the organo-silicon high molecular weight compound without emulsifying this compound, respectively. Particularly, the former mixing and impregnation with the organo-silicon compound will result in improvement in mechanical properties of expanded graphite moldings having a low specific gravity, the improvement having heretofore been considered to be difficult.

The mixing and impregnation with the organo-silicon compound emulsion will be detailed hereinbelow.

The organo-silicon high molecular weight compound such as polysilmethylene is emulsified in the presence of a suitable solvent such as n-hexane or xylene, an emulsifier and water by the use of a usual method. The emulsifier includes a non-ionic surface-active agent such as a polyoxyethylene octylphenol ether, polyoxyethylenepolyoxypropylene alkyl ether, polyoxyethylene alkyl ether, sorbitan fatty acid ester or polyoxyethylene castor oil derivative, as well as a cationic surface active agent or an anionic surface active agent. The organo-silicon compound emulsion so formed is sprayed to the particulate expanded graphite to obtain an impregnated graphite by using a sprayer such as a spray gun, or it is applied to, or impregnated in, the expanded graphite molded into a sheet having a low density (bulk density: about 0.06) by the use of a sprayer. In the case of impregnation with an emulsion, the emulsion used herein is composed preferably of, by weight, 1 part of the organo-silicon high molecular weight compound, 0–4 parts of an organic solvent therefor and 0.1–1 part of an emulsifier. The particulate expanded graphite so impregnated is subjected to compression molding in a mold or compression molding with rolls to obtain a sheet having a bulk density of about 0.2 which is then dried at 80°–100° C. for several hours to remove the solvent therefrom. In addition, such a sheet having a bulk density of about 0.06 may be dried at ambient temperature (without heating). If the emulsion-mixed particulate expanded graphite is difficult to mold because of its high moisture content, it may be dried prior to being molded. Particularly in molding with a mold, it is preferable to effect the drying prior to the molding. The sheet so dried is then pressure or roll molded to obtain a sheet having a desired thickness (or a bulk density of preferably about 0.3–2.0). Thereafter, the sheet so molded is heat treated at 500°–2000° C., preferably 700°–1400° C., in a non-oxidizing atmosphere. Likewise in the molding with a mold, the particulate expanded graphite after dried, is molded to obtain a molding having a desired density which is then heat treated.

As will be seen from Examples 1–3 to be described later, the aforesaid process of this invention makes it possible to yield expanded graphite moldings having greatly improved mechanical properties such as mechanical strength, as compared with the conventional ones. The process of this invention also makes it possible to yield expanded graphite moldings having a low specific gravity on one hand and improved mechanical properties on the other hand despite the fact that this has hitherto been considered to be difficult to realize. More specifically, the conventional flexible graphite tends to be too much tightened when used as packing or gasket material because of its too high compressibility and has low recovery after compression thereof thereby raising a problem as to sealability, while the flexible graphite material of this invention is remarkably improved in these properties over the conventional one.

Since the organo-silicon high molecular weight compound is used in aqueous emulsion form, the emulsified organo-silicic compound may be mixed with the particulate expanded graphite by the use of a device such as a spray gun and may also be impregnated in the expanded graphite molding; this is advantageous in that the amount of an organic solvent required is less and the operation is simple and desirable from the view-point of safety because of no fire hazards which might otherwise be caused by ignition of the solvent.

This invention will be better understood by the following non-limitative Examples wherein all the percentages for showing the amounts of materials used are by weight unless otherwise specified.

EXAMPLE 1

Ninety (90) parts of a particulate expanded graphite (c direction expansion: 300 times) and 10 parts of an organo-silicon high molecular weight compound composed mainly of polysilmethylene having an average molecular weight of 2000, were mixed together to form a mixture which was then compression molded in a mold and then heat treated in a nitrogen atmosphere at 900° C. for 6 hours thereby to obtain a desired flexible graphite molding.

EXAMPLE 2

The procedure of Example 9 was followed except that the heat treatment was carried out at 1400° C., thereby to obtain a desired flexible graphite sheet.

EXAMPLE 3

Ninety (90) parts of a particulate expanded graphite (c direction expansion: 300 times) and 10 parts of an organo-silicon high molecular weight compound with an average molecular weight of 1800 consisting substantially of polysilmethylene were mixed together to produce a mixture which was then compression molded in a mold to obtain a molding having a bulk density of 1.5. The molding so obtained was heat treated at 900° C. for one hour in a nitrogen (N$_2$) atmosphere.

EXAMPLE 4

The procedure of Example 3 was followed except that a heat treating temperature of 1400° C. was substituted for the treating temperature of 900° C.

EXAMPLE 5

The procedure of Example 3 was followed except that a molding having a bulk density of 1.1 was substituted for the molding having a bulk density of 1.5.

COMPARATIVE EXAMPLE 4

A particulate expanded graphite (c direction expansion: 300 times) was molded in a mold by the use of a conventional method to obtain moldings respectively having bulk densities of 1.50 and 1.40.

The flexible expanded graphite moldings obtained in examples 3-7 and 12-15 and Comparative example 4 were tested for oxidation resistance and bend strength by using test pieces, 10 mm wide×60 mm long×9 mm thick each, prepared from said moldings. The results are shown in the following Table 1.

TABLE 1

| | Bulk density | Ratio of consumption by oxidation in air at 700° C. for 100 hrs (%) | Bend strength (Kg/cm$^2$) |
| --- | --- | --- | --- |
| Example 3 | 1.48 | 9.0 | 250 |
| Example 4 | 1.47 | 6.6 | 320 |
| Example 5 | 1.05 | 15.0 | 190 |
| Example 6 | 1.46 | 7.5 | 300 |
| Example 7 | 1.44 | 6.0 | 380 |
| Example 12 | 1.49 | 5.1 | 350 |
| Example 13 | 1.47 | 10.5 | 230 |
| Example 14 | 1.48 | 9.8 | 250 |
| Example 15 | 1.46 | 9.1 | 360 |
| Comparative example 4 | 1.50 | Reduced to ashes | 120 |
| | 1.40 | " | 108 |

In addition, the flexible expanded graphite moldings obtained in examples 3-7 and 12-15 exhibited a compressibility of 5-6% under a load of 100 Kg/cm$^2$ and a recovery ratio of at least 99%, while those obtained in Comparative example 4 exhibited a compressibility of 9-11% under the same load as above and a recovery ratio of 68-72%. This shows that the former had excellent flexibility as compared with the latter.

As is seen from the foregoing, the flexible graphite material of this invention are excellent particularly in oxidation resistance as compared with the conventional ones. Thus, when they are used as material for packing and gaskets, the resulting packing and gaskets will be able to be used without troubles at a much higher temperature and for a much longer time in an oxidizing atmosphere than possible heretofore.

EXAMPLE 6

Seventy (70) parts of a particulate expanded graphite (c direction expansion: 50 times) and 30 parts of an organo-silicon high molecular weight compound with an average molecular weight of 1500 consisting substantially of polysilmethylene were mixed together.

The resulting mixture was formed in a mold to obtain a molding having a bulk density of 1.5 which was then heat treated at 900° C. for one hour in an argon (Ar) atmosphere.

EXAMPLE 7

The procedure of Example 6 was followed except that the same molding was further heat treated at 1400° C. for one hour.

EXAMPLE 8

An expanded graphite molding having a bulk density of 1.4 (prepared from a particulate expanded graphite having a c direction expansion of 250 times) was immersed in a 50 wt.% divinylbenzene solution of an organo-silicon high molecular weight compound composed substantially of polycarbosilane having an average molecular weight of 850 to obtain an impregnated molding which was cured at 150° C. for 5 hours and then heat treated in a nitrogen atmosphere at 900° C. for 2 hours thereby to obtain a desired flexible graphite molding. The cured molding so obtained increased in weight by 5.5% of the original molding since it contained the heat treated silicon compound.

COMPARATIVE EXAMPLE 3

A particulate expanded graphite (c direction expansion: 300 times) was molded in a mold to obtain two expanded graphite moldings having bulk densities of 1.50 and 1.40 respectively.

Test pieces, 10 mm wide×60 mm long×9 mm thick, were prepared from the moldings obtained in Examples 1, 2 and 8 and Comparative Example 3, were tested for oxidation resistance and bend strength. The results are indicated in Table 2.

TABLE 2

| | Bulk density | Consumption ratio in air at 700° C. for 100 hrs (%) | Bend strength (Kg/cm$^2$) |
| --- | --- | --- | --- |
| Example 1 | 1.42 | 9.2 | 240 |
| Example 2 | 1.40 | 8.1 | 300 |
| Example 8 | 1.48 | 5.0 | 355 |
| Comparative example 3 | 1.50 | Reduced to ashes | 120 |
| | 1.40 | " | 108 |

The flexible expanded graphite moldings obtained in Examples 1, 2 and 8 and the moldings obtained in Comparative example 3 were tested under a load of 100 Kg/cm$^2$ for compressibility and recovery ratio with the result that the compressibility and recovery ratio for the examples were 5-6% and at least 99% respectively, while those for the Comparative example were 9-11% and and 68-72% respectively, the former (examples) indicating excellent flexibility as compared with the latter (Comparative Example).

EXAMPLE 9

Ten (10)% of an organo-silicon high molecular weight compound (polycarbosilane) having an average molecular weight of 1450, 20% of xylene, 5% of an emulsifier (polyoxyethylene octylphenol ether) and 65% of water were mixed together to obtain an emulsion of the organo-silicon compound. Each of expanded graphite sheets having a bulk density of 0.06 (prepared from a particulate expanded graphite having a c direction expansion of 250 times) was impregnated with the thus-obtained emulsion in such an amount that the sheet so impregnated contained the organo-silicon compound in the amount of 1% of the original sheet. The sheets so impregnated were dried at 100° C. for 10 hours, molded with rolls to obtain moldings having a bulk density in the range of 0.8–1.30 and then heat treated in a nitrogen (N₂) atmosphere at 700° C. and 900° C. for one hour, respectively, thereby obtaining flexible graphite sheets.

EXAMPLE 10

There was prepared an emulsion consisting of 10% of an organo-silicon high molecular weight compound (polycarbosilane) having an average molecular weight of 1450, 20% of xylene, 5% of the same emulsifier as used in Example 9 and 65% of water. The emulsion so prepared was sprayed to a particulate expanded graphite (c direction expansion: 250 times) in such an amount that the thus-sprayed particulate graphite contained the organo-silicon compound in the amount of 1% of the original graphite to obtain an emulsion-impregnated graphite which was molded by a press to the extent that the resulting sheets had a bulk density of 0.2. The resulting sheets were dried at 100° C. for 10 hours, further molded with rolls to yield sheets having a bulk density in the range of 0.8–1.3 and then heat treated in a nitrogen (N₂) atmosphere at 700° C. and 900° C. for one hour, respectively, thereby to obtain flexible graphite sheets.

EXAMPLE 11

Ten (10)% of an organo-silicon high molecular weight compound (polysilmethylene) having an average molecular weight of 800, 5% of the same emulsifier as used in Example 9 and 85% of water were mixed together to prepare an emulsion which was sprayed to a particulate expanded graphite (c direction expansion: 250 times) in such an amount that the thus-sprayed graphite contained the organo-silicon compound in the amount of 10% of the original graphite. The particulate expanded graphite so impregnated was dried at 100° C. for 10 hours, subjected to die compression molding to form a molding having a bulk density of 1.5 and then heat treated in a nitrogen (N₂) atmosphere at 900° C. for one hour thereby to obtain a desired flexible molding.

COMPARATIVE EXAMPLE 1

A particulate expanded graphite having a c direction expansion of 250 times was molded with rolls to obtain a graphite molding having a bulk density of 1.0.

COMPARATIVE EXAMPLE 2

A particulate expanded graphite having a c direction expansion of 250 times was subjected to die molding to obtain a graphite molding having a bulk density of 1.50.

Figure 2:
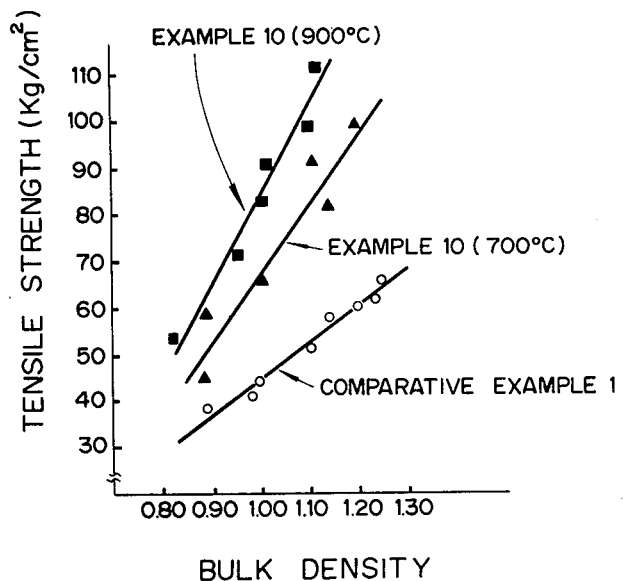

Test pieces, 10 mm wide×80 mm long×0.3 mm thick, were prepared from each of the moldings obtained in Examples 9, 10 and Comparative Example 1. The test pieces so prepared were tested for tensile strength under the test conditions of a pulling velocity of 1 mm/min. and a span of 40 mm. For comparison, FIG. 1 shows the relationship between the tensile strength and bulk density of each of the final sheets obtained in Example 9 and Comparative Example 1, and FIG. 2 shows the relationship between the tensile strength and bulk density of each of the final sheets obtained in Example 10 and Comparative Example 1.

It is seen from these Figures that the final sheets obtained in the Examples exhibited much improved tensile strength as compared with those in the Comparative Examples.

Then, test pieces, 10 mm wide×60 mm long×9 mm thick, were prepared from each of the moldings obtained in Example 11 and Comparative Example 2. The test pieces so prepared were tested for oxidation resistance and bend strength with the results being shown in Table 3.

TABLE 3

| | Bulk density | Ratio of consumption in air at 700° C. for 100 hours (%) | Bend strength (Kg/cm²) |
|---|---|---|---|
| Example 11 | 1.50 | 12.5 | 280 |
| Comparative example 2 | 1.50 | Reduced to ashes | 120 |

It is seen from Table 3 that the molding according to this invention are excellent in oxidation resistance and bend strength as compared with the conventional expanded graphite molding.

Then, each of the final sheets or moldings obtained in Examples 9, 10 and 11 as well as Comparative Examples 1 and 2, was tested for compressibility and recovery ratio. The weight or load used was 100 Kg/cm² in each case. The results are indicated in Table 4.

TABLE 4

| | Bulk density | Compressibility % | Recovery ratio % |
|---|---|---|---|
| Example 9 (700° C.) | 1.0 | 15–20 | 35–40 |
| Example 9 (900° C.) | 1.0 | 10–17 | 40–43 |
| Example 10 (700° C.) | 1.0 | 13–20 | 30–43 |
| Example 10 (900° C.) | 1.0 | 12–18 | 38–45 |
| Example 11 | 1.5 | 5–6 | 95–99 |
| Comparative example 1 | 1.0 | 23–27 | 15–20 |
| Comparative example 2 | 1.5 | 9–11 | 68–72 |

As is apparent from Table 4, the final sheets or molding according to this invention are suitable in compressibility and improved in recovery ratio as compared with the conventional expanded graphite sheets or molding. These tendencies are remarkable particularly for the final sheets and moldings having a low bulk density of 1.0.

EXAMPLE 12

A molded expanded graphite having a bulk density of 1.4 (starting particulate expanded graphite: c direction expansion of 200 times) was immersed in a 50 wt.% DVB (divinylbenzene) solution of an organo-silicon high molecular weight compound with an average molecular weight of 900 consisting substantially of polycarbosilane to impregnate the molding with the solution. The thus impregnated molding was cured at 150° C. for 5 hours and then heat treated at 900° C. for 2 hours in a nitrogen (N₂) atmosphere.

EXAMPLE 13

Eighty (80) parts of a particulate expanded graphite (c direction expansion: 300 times) and 20 parts of a 30 wt.% colloidal silica were reacted together. The resulting mixture was compression molded in a mold to obtain a molding having a bulk density of 1.5 which was then heat treated at 850° C. for 2 hours in vacuo.

EXAMPLE 14

A particulate expanded graphite having a c direction expansion of 150 times was molded. The resulting molded expanded graphite having a bulk density of 1.4 was degassed at a reduced pressure of 5 Torr in an autoclave, immersed in a 20 wt.% colloidal silica, pressure impregnated therewith at an air pressure of 6 kg/cm$^2$G, cured at 105° C. for 5 hours and then heat treated at 900° C. for 2 hours in vacuo.

EXAMPLE 15

The procedure of Example 14 was followed except that the same molding was further heat treated at 1600° C. for one hour.

What is claimed is:

1. A process for producing flexible graphite comprising incorporating particulate expanded graphite having a c direction expansion at least 10 times as great as that of the original c direction dimension with 5–40% by weight, based on the graphite, of a member selected from the group consisting of colloidal silicas containing 10–30% by weight of SiO$_2$ and organo-silicon high molecular weight compounds having carbon and silicon as the skeletal components to form a mixture, drying the mixture so formed, pressure molding the dried mixture to an extent that the mixture so molded has a predetermined bulk density and then heat treating the molded mixture at 500°–2000° C. thereby to produce the flexible graphite.

2. A process for producing flexible graphite comprising molding particulate expanded graphite having a c direction expansion at least 10 times as great as that of the original c direction dimension to form an expanded graphite molding, impregnating the thus-formed expanded graphite molding with a member selected from the group consisting of containing 3–10% by weight of impregnated silicon compound based on the graphite.

3. A process according to claim 1, further comprising preliminarily molding the mixture of the expanded graphite and the silicon compound before the drying of the mixture.

4. A process according to claim 2, further comprising pressure molding the dried molding before the heat treatment thereof.

5. A process according claim 1, wherein the organo-silicon high molecular weight compound is a member selected from the group consisting of:
   (1) compounds having the following skeletal component

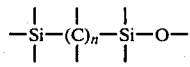

wherein n is an integer of from 1 to 6,
   (2) compounds having the following skeletal component

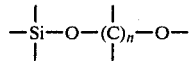

wherein n is as defined above,
   (3) compounds having the following skeletal component

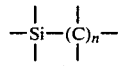

wherein n is as defined above, and
   (4) compound having at least one of the skeletal components (1) to (3) in their chain, cyclic or three dimensional molecular structure, and
   (5) mixtures of at least two of the compounds (1) to (4).

6. A process according to claim 5, wherein the colloidal silica is one containing SiO$_2$ in a concentration of 10–30% by weight.

7. A process according to claim 1, wherein the particulate expanded graphite is incorporated with the organo-silicon high molecular weight compound in an amount of 1–50% by weight of the graphite.

8. A process according to claim 1, wherein the particulate expanded graphite is incorporated with 5–40% by weight, based on the graphite, of a colloidal silica containing 20–30% by weight of SiO$_2$.

9. A process for producing flexible graphite comprising molding particulate expanded graphite having a c direction expansion at least 10 times as great as that of the original c direction dimension to form an expanded graphite molding, impregnating the thus-formed expanded graphite molding with a colloidal silica containing SiO$_2$ in a concentration of 12–20% to yield an impregnated molding, drying the thus-impregnated molding and then heat treating the dried molding at 500°–2000° C. to produce the flexible graphite.

10. A process for producing flexible graphite comprising incorporating particulate expanded graphite having a c direction expansion at least 10 times as great as that of the original c direction dimension with 5–40% by weight, based on the graphite, of a member selected from the group consisting of colloidal silicas containing 10–30% by weight of SiO$_2$ and organo-silicon high molecular weight compounds having carbon and silicon as the skeletal components to form a mixture, drying the mixture so formed, pressure molding the dried mixture to an extent that the mixture so molded has a predetermined bulk density and than heat treating the molded mixture at 500°–2000° C. and, as an added step, if a temperature higher than 800° C. has not already been attained, heating at a temperature higher than 800° C., thereby to produce flexible graphite having a compressibility of 5–6% under a load of 100 kg/cm$^2$ and a recovery ratio of 95–99%.